United States Patent
Ullom

(10) Patent No.: US 9,192,100 B1
(45) Date of Patent: Nov. 24, 2015

(54) APPARATUS FOR CLEARING MATTED GRASS CLIPPINGS FROM LAWNMOWER DISCHARGE PORT

(71) Applicant: Jonathan Ullom, Lake Wales, FL (US)

(72) Inventor: Jonathan Ullom, Lake Wales, FL (US)

( * ) Notice: Subject to any disclaimer, the term of this patent is extended or adjusted under 35 U.S.C. 154(b) by 0 days.

(21) Appl. No.: 14/287,992

(22) Filed: May 27, 2014

Related U.S. Application Data

(60) Provisional application No. 61/827,282, filed on May 24, 2013.

(51) Int. Cl.
  *A01D 19/00* (2006.01)
  *A01D 75/00* (2006.01)

(52) U.S. Cl.
  CPC .................................... *A01D 75/00* (2013.01)

(58) Field of Classification Search
  CPC ... A01D 34/003; A01D 34/005; A01D 34/71; A01D 2101/00; A01D 34/49; A01D 34/62
  USPC ....... 56/16.8, 202, 320.2, 17.2, 17.4, DIG. 20
  See application file for complete search history.

(56) References Cited

U.S. PATENT DOCUMENTS

| | | | |
|---|---|---|---|
| 2,578,880 A * | 12/1951 | Doyle | 56/17.2 |
| 2,667,028 A * | 1/1954 | Weishaar | 56/473.5 |
| 2,802,327 A * | 8/1957 | Thelander | 56/17.4 |
| 3,105,341 A * | 10/1963 | De Murrel | 56/192 |
| 3,404,519 A * | 10/1968 | Demers | 56/14.7 |
| 3,636,686 A * | 1/1972 | Meyer et al. | 56/320.2 |
| 3,925,972 A * | 12/1975 | Andersson | 56/320.2 |
| 4,226,074 A * | 10/1980 | Mullet et al. | 56/320.2 |
| 4,637,203 A * | 1/1987 | Fedeli | 56/202 |
| 4,848,070 A * | 7/1989 | Berglund | 56/202 |
| 5,033,260 A * | 7/1991 | Jerry | 56/320.2 |
| 5,133,175 A * | 7/1992 | Dumbrell | 56/17.4 |
| 6,006,506 A * | 12/1999 | Dawson | 56/320.2 |
| 6,874,309 B1 * | 4/2005 | Bellis, Jr. | 56/320.2 |
| 6,966,169 B2 * | 11/2005 | Osborne | 56/202 |
| 6,971,224 B1 * | 12/2005 | Hancock | 56/320.2 |
| 7,337,602 B1 * | 3/2008 | Butler et al. | 56/320.2 |
| 7,448,195 B2 * | 11/2008 | Kohler | 56/320.2 |
| 7,624,562 B2 * | 12/2009 | Kallevig et al. | 56/320.2 |
| 7,775,027 B2 * | 8/2010 | Wang et al. | 56/320.2 |
| 2005/0144924 A1* | 7/2005 | Osborne | 56/320.2 |
| 2006/0026941 A1* | 2/2006 | Iannello | 56/16.8 |
| 2007/0068132 A1* | 3/2007 | Chenevert | 56/320.1 |

(Continued)

FOREIGN PATENT DOCUMENTS

CN 203407224 U * 1/2014 ............. A01D 43/06

*Primary Examiner* — Árpád Fábián-Kovács
(74) *Attorney, Agent, or Firm* — Ronald E. Smith; Smith & Hopen, P.A.

(57) ABSTRACT

An apparatus that removes matted clumps of wet grass from a lawnmower discharge port includes a hinge having a first flap secured to a trailing edge of the discharge port. A second flap is secured to a rigid flat plate about mid-length of the plate. The plate has a position of repose normal to a longitudinal axis of symmetry of the lawnmower and a pivoted position parallel to the longitudinal axis. The position of repose allows grass clippings propelled by a rotating blade to travel without obstruction toward the discharge port. A cord is secured to the plate so that a lawnmower operator can cause the plate to pivot from its position of repose to drive matted clippings through the discharge port. A torsion spring resists the pivoting of the plate and returns the plate to its position of repose when the cord is released by the operator.

2 Claims, 4 Drawing Sheets

(56) References Cited

U.S. PATENT DOCUMENTS

| | | | |
|---|---|---|---|
| 2009/0260338 A1* | 10/2009 | Benway | 56/202 |
| 2012/0067019 A1* | 3/2012 | Luking | 56/320.2 |
| 2014/0075901 A1* | 3/2014 | Kimura et al. | 56/2 |
| 2014/0318099 A1* | 10/2014 | Thorman et al. | 56/320.2 |

* cited by examiner

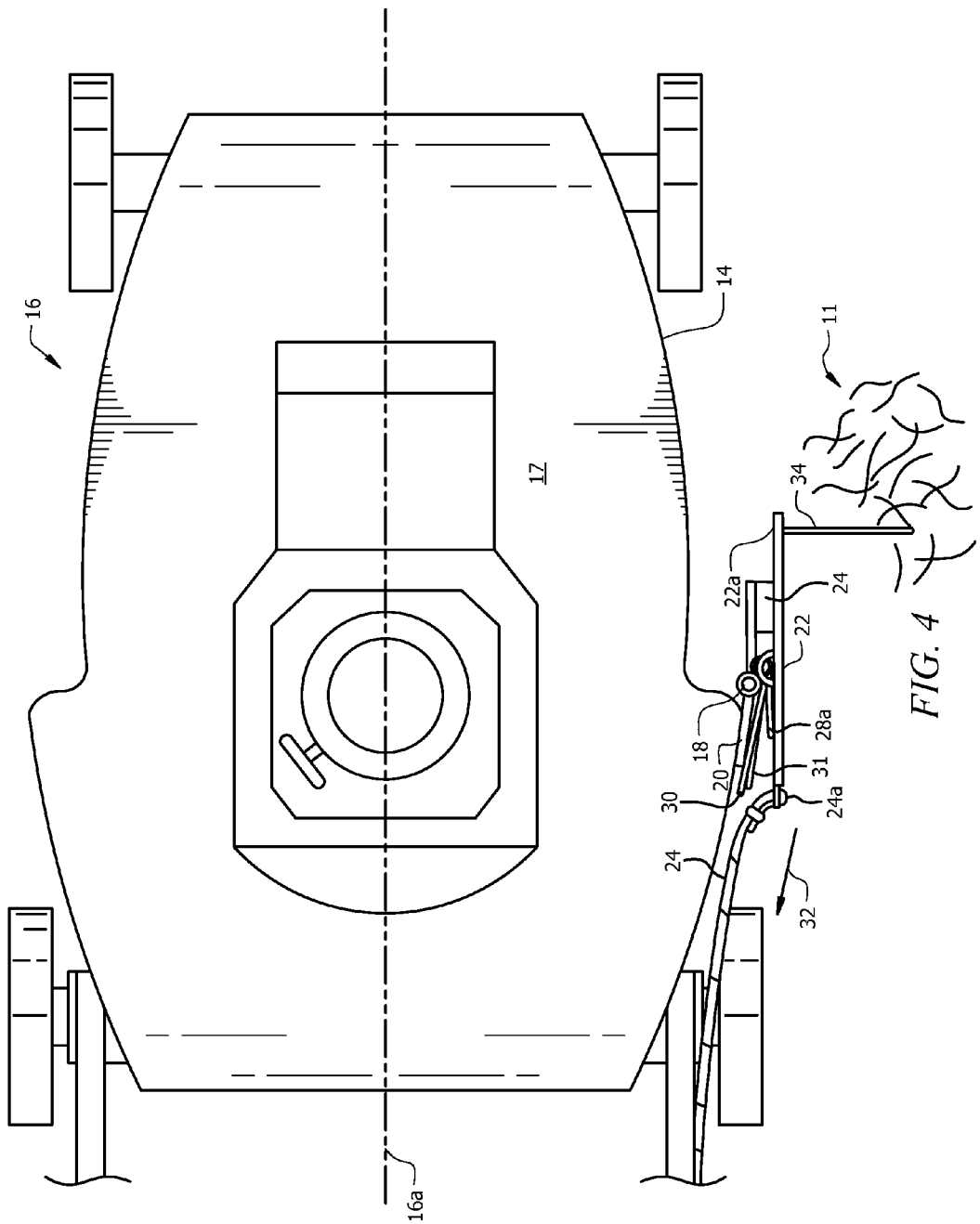

APPARATUS FOR CLEARING MATTED GRASS CLIPPINGS FROM LAWNMOWER DISCHARGE PORT

BACKGROUND OF THE INVENTION

1. Field of the Invention

This invention relates to improvements in lawnmowers. More specifically, it relates to an attachment that enables unclogging of a grass-clogged discharge port.

2. Brief Description of the Related Art

Lawnmowers with motor-driven blades have a side discharge port formed in a blade housing from which mowed grass clippings are discharged. When the grass being mowed is dry, the clippings do not cling to one another and they are propelled by the lawnmower blade through the port.

The discharge port becomes clogged when wet grass is mowed. The clippings cling to one another and gradually form a matted clump or mass that clogs the relatively small opening of the discharge port. If this condition is ignored, the mass builds up inside the blade housing and adversely affects rotation of the blade.

A clogged discharge port must therefore be cleaned out. This requires shutting down the mower, manual displacement of the mass of clippings that have clogged the discharge port, and re-starting the mower. This process must be repeated frequently.

Thus there is a need for an improved method of clearing a lawnmower discharge port that is clogged with wet grass clippings. The improved method would not require that the motor be shut down and re-started but would remove the clogged material safely with no danger to the mower operator even when the mower is running.

However, in view of the art considered as a whole at the time the present invention was made, it was not obvious to those of ordinary skill in the field of this invention how to provide an apparatus that could perform the needed method.

BRIEF SUMMARY OF THE INVENTION

The long-standing but heretofore unfulfilled need for an apparatus that safely clears wet, matted grass from a clogged lawnmower discharge port is now met by a new, useful, and nonobvious invention.

The novel apparatus includes a rigid flat plate hingedly mounted to a trailing edge of the discharge port. The rigid flat plate has a position of repose where it is substantially normal to a longitudinal axis of symmetry of the lawnmower, and it has a deployed position where it is substantially parallel to the longitudinal axis of symmetry of the lawnmower.

An elongate cord has a leading end secured to an outboard end of the rigid flat plate and a trailing end adapted to be grasped by an operator of the lawnmower. The rigid flat plate is rotated from its position or repose to its deployed position when the operator pulls on the cord in a leading-to-trailing direction. A spring is loaded when the cord is pulled upon and the spring returns the rigid flat plate to its position of repose when the cord is released.

A torsion spring is mounted to the rigid flat plate such that a first end of the torsion spring abuts the rigid flat plate. A second end of the torsion spring is disposed in overlying relation to a preselected flap of the hinge so that rotation of the rigid flat plate from its position of repose loads the torsion spring. The torsion spring unloads and returns the rigid flat plate to the position of repose when the cord is released as aforesaid.

More particularly, the novel apparatus includes a hinge having a first flap adapted to be fixedly secured to a blade housing adjacent a trailing edge of the discharge port.

The novel structure further includes a rigid flat plate having a predetermined length and height. A second flap of the hinge is fixedly secured to the rigid flat plate about mid-length of the rigid flat plate.

The rigid flat plate has a position of repose where the rigid flat plate is disposed normal to a longitudinal axis of symmetry of the lawnmower. When so disposed, an inboard end of the rigid flat plate is positioned inside a hollow interior of the blade housing and an outboard end thereof is positioned externally to the blade housing.

The position of repose of the rigid flat plate allows grass clippings that are propelled by a rotating blade of the lawnmower to travel without obstruction toward the discharge port.

An elongate cord has a leading end secured to the outboard end of the rigid flat plate and a trailing end adapted to be grasped by a lawnmower operator.

A torsion spring is secured to the rigid flat plate and applies no bias to the rigid flat plate when the rigid flat plate is in its position of repose.

Manual pulling on the cord during lawnmower operation by a lawnmower operator standing in trailing relation to the discharge port causes pivoting about the hinge of the rigid flat plate relative to the position of repose. The pivoting creates a bias supplied by the torsion spring and causes the inboard end of the rigid flat plate to drive matted grass out of the discharge port.

The rigid flat plate has a fully rotated position when the cord is fully retracted by the lawnmower operator in a leading-to-trailing direction. When the cord is fully retracted, the rigid flat plate is substantially parallel to the longitudinal axis of symmetry of the lawnmower, thereby clearing the discharge port of the matted grass clippings.

The operation of the rigid flat plate may be further enhanced by a nail-like spike that is mounted normal to a plane of the rigid flat plate. The spike is mounted to the inboard end of the rigid mounting plate on the leading side thereof and is therefore substantially parallel to the longitudinal axis of symmetry of the lawnmower when the rigid flat plate is in its position of repose.

The spike is normal to the longitudinal axis of symmetry of the lawnmower when the rigid flat plate is in its fully rotated position and is positioned externally of the blade housing when the rigid flat plate is in said fully rotated position.

An important object of the invention is to provide an apparatus that clears matted wet grass from a lawnmower discharge port.

Another important object is to accomplish the unclogging of a discharge port even when the lawnmower is operating, thereby avoiding shutdown of the lawnmower motor.

It is also an object of this invention to accomplish the foregoing object in a safe manner.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed disclosure, taken in connection with the accompanying drawings, in which:

FIG. 4 is a top plan view of the novel device when activated by pulling a cord.

DETAILED DESCRIPTION OF THE PREFERRED EMBODIMENT

Figure 1:
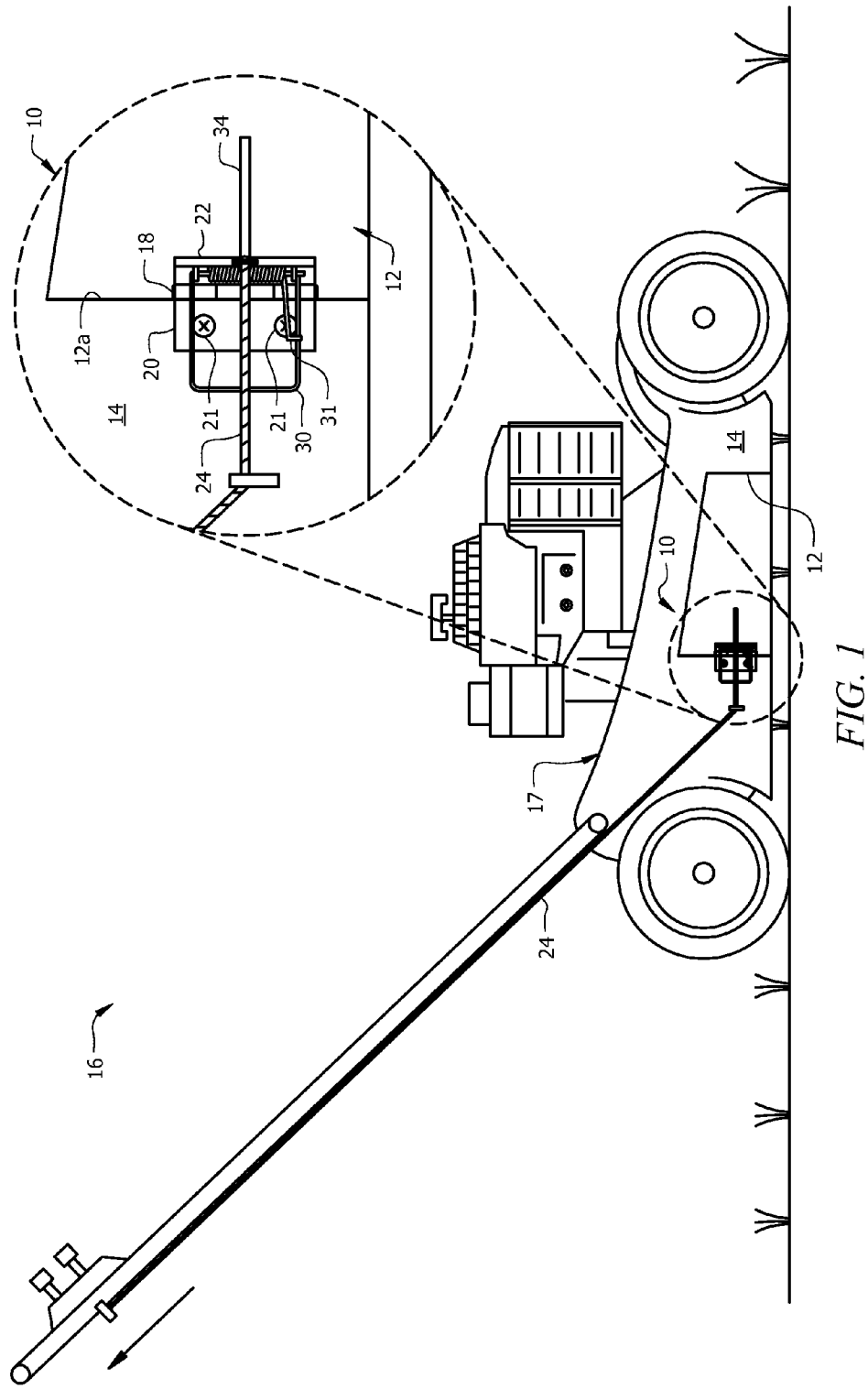
FIG. 1 is a side elevational view of a lawnmower and includes an enlarged view of the novel discharge port cleaning device.

The novel structure is denoted as a whole in FIG. 1 by the reference numeral 10.

Novel apparatus 10 removes matted clumps of wet grass from lawnmower discharge port which is 12 formed in blade housing wall 14 of blade housing 17 of lawnmower 16.

Figure 2:
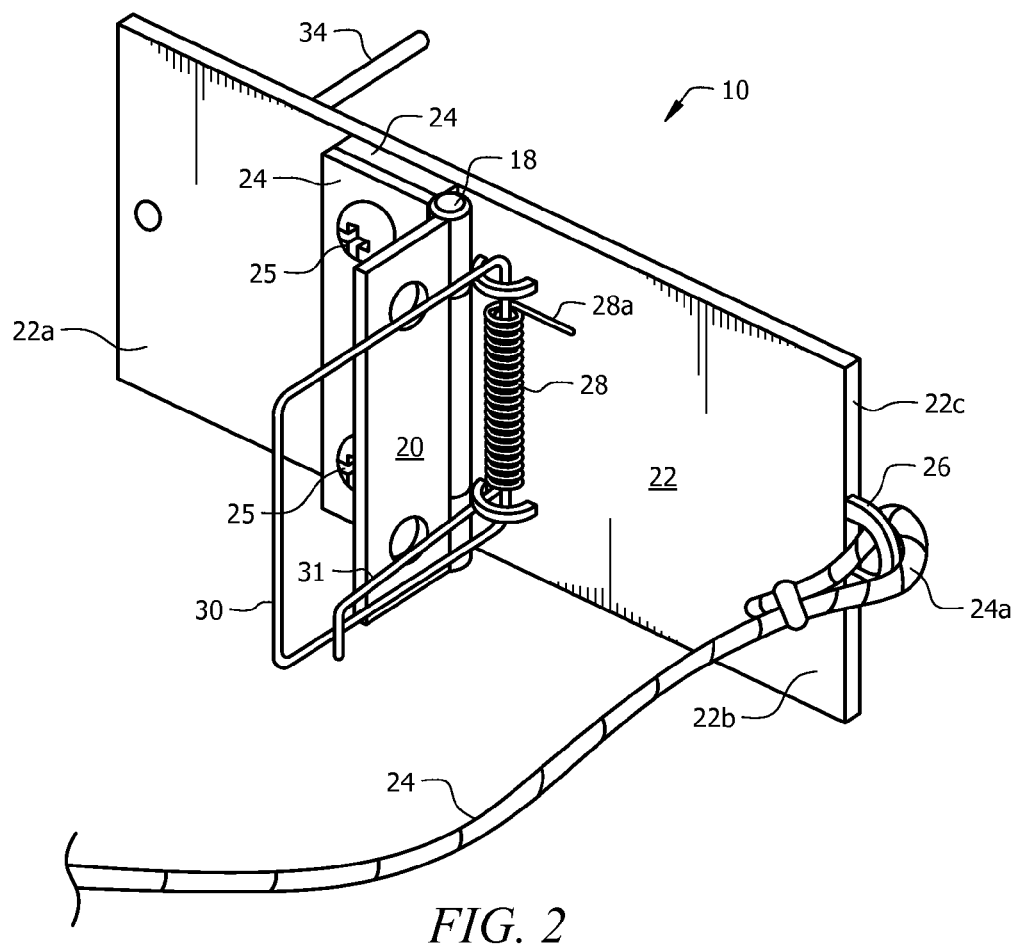
FIG. 2 is a perspective view of the novel device.

As best understood in connection with FIG. 2, first hinge flap 20 is hingedly connected to hinge post 18. As best depicted in FIG. 1, hinge flap 20 is fixedly secured to blade housing wall 14 adjacent trailing edge 12a of discharge port 12 by suitable fastening means 21.

Returning now to FIG. 2, novel apparatus 10 further includes rigid flat plate 22 having a predetermined length and height. Second hinge flap 24 is hingedly connected to hinge post 18 and is fixedly secured to rigid flat plate 22 by suitable fastening means 25.

Figure 3:
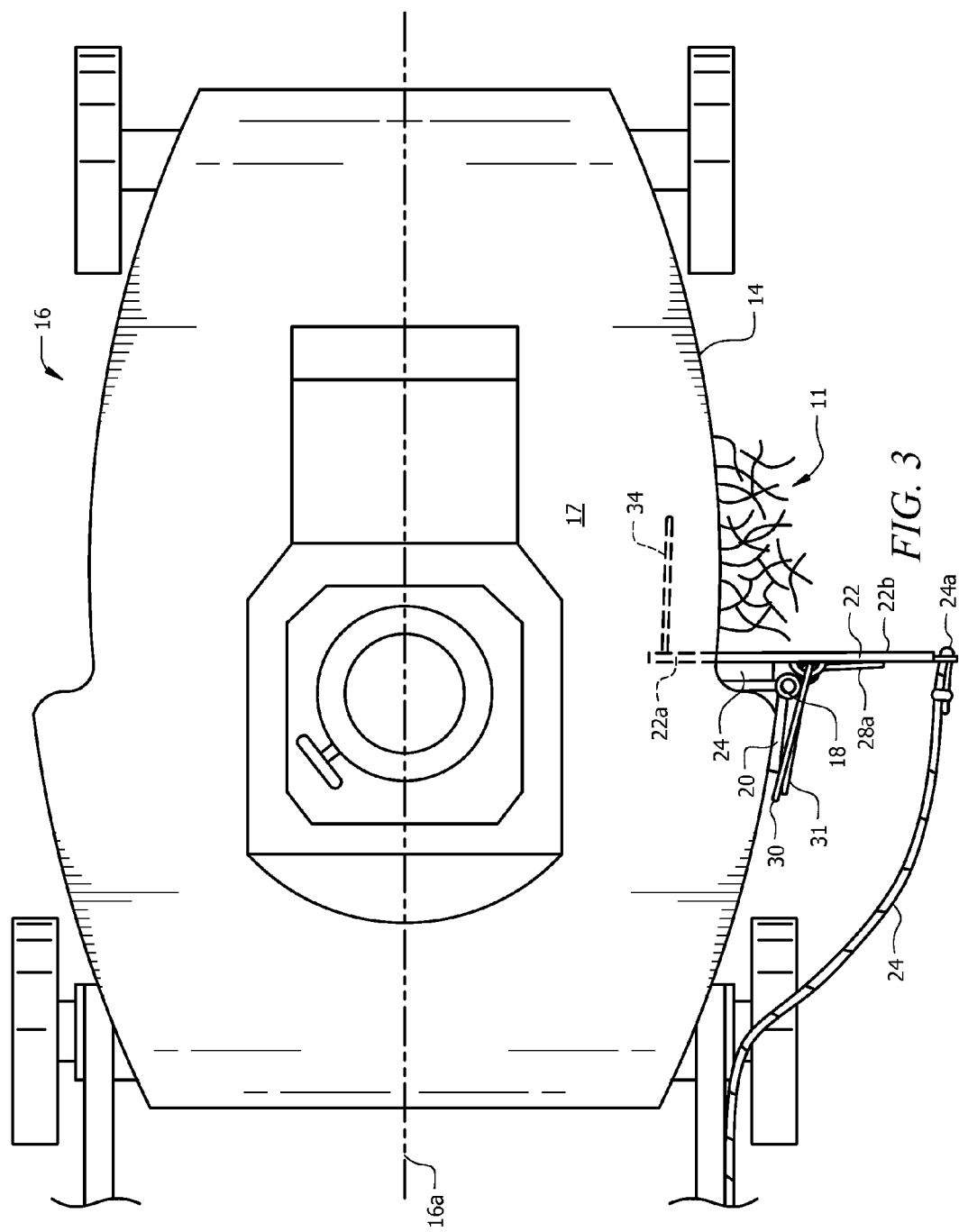
FIG. 3 is a top plan view of the novel device in its position of repose.

Rigid flat plate 22 has a position of repose where it is disposed substantially normal to blade housing wall 14 as depicted in FIGS. 1 and 3. As depicted in FIG. 3, inboard end 22a of rigid flat plate 22 is positioned inside a hollow interior of lawnmower blade housing 17 and outboard end 22b thereof is positioned externally to blade housing 17 when rigid flat plate 22 is in said position of repose.

The position of repose of rigid flat plate 22 allows grass clippings 11 that are propelled by a rotating blade of lawnmower 16 to travel without obstruction toward discharge port 12 as suggested by FIG. 3.

Elongate cord 24 has a leading end 24a secured to a preselected outboard edge of rigid flat plate 22 and a trailing end of the cord, not depicted, is adapted to be grasped by a lawnmower operator. In a preferred embodiment, eye loop 26 (FIG. 2) is secured to outboard edge 22c of rigid flat plate 22 and leading end 24a of cord 24 is secured to the eye loop.

Torsion spring 28 is mounted in overlying relation to rigid flat plate 22 and includes arm 28a that abuts rigid flat plate 22. Torsion spring 28 applies no bias to rigid flat plate 22 when the rigid flat plate is in its position of repose.

Frame 30 is held in abutting relation to hinge flap 20 by arm 31 of torsion spring 28. It exerts no bias against rigid flat plate 22 when said rigid flat plate in said position of repose. Second end 31 of torsion spring 28 is disposed in overlying relation to hinge flap 20 but could directly abut hinge flap 20, thereby cooperating with first end 28a of said torsion spring to load said spring as rigid plate 22 is displaced away from its position of repose. It is preferred, however, that second end 31 is placed into abutting relation to frame 30 so that the torque generated by torsion spring 28 is evenly distributed across hinge flap 20. Frame 30 is captured by but is free to rotate with respect to unnumbered semicircular members formed integrally with rigid flat plate 22, mid-length thereof.

Manual pulling on elongate cord 24 during lawnmower operation by a lawnmower operator standing in trailing relation to discharge port 12 causes pivoting about hinge post 18 of rigid flat plate 22 relative to its position of repose as best understood by comparing FIGS. 3 and 4. The pivoting creates a bias supplied by torsion spring 28 and causes inboard end 22a of rigid flat plate 22 to drive matted grass 11 out of discharge port 12. The bias returns rigid flat plate 22 to its position of repose as the lawnmower operator releases cord 24 after successful clearing of discharge port 12.

Rigid flat plate 22 has a fully rotated position when cord 24 is fully retracted by the lawnmower operator in a leading-to-trailing direction, indicated by directional arrow 32 in FIG. 4. When cord 24 is fully retracted, the spring-supplied bias is at its maximum and rigid flat plate 22 is parallel or nearly parallel to blade housing wall 14, thereby clearing discharge port 12 of the matted grass clippings.

The operation of rigid flat plate 22 may be further enhanced by nail-like spike 34 that is secured to rigid flat plate 22 in normal relation thereto. Spike 34 is mounted to inboard end 22a of rigid mounting plate 22 and is therefore parallel to or almost parallel to longitudinal axis of symmetry 16a of lawnmower 16 when rigid flat plate 22 is in its position of repose.

Spike 34 is normal or almost normal to longitudinal axis of symmetry 16a when rigid flat plate 22 is in its fully rotated position and said spike is positioned externally of blade housing 17 when rigid flat plate 22 is in said fully rotated position.

The objects and advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An apparatus that removes matted clumps of wet grass from a lawnmower discharge port formed in a blade housing of said lawnmower, comprising:

a hinge having a first flap adapted to be fixedly secured to said blade housing, said first flap fixedly secured to said blade housing adjacent a trailing edge of said discharge port;

a rigid flat plate having a predetermined length and height;

a second flap of said hinge being fixedly secured to said rigid flat plate about mid-length of said rigid flat plate;

said rigid flat plate having a position of repose where said rigid flat plate is normal to said blade housing and to a longitudinal axis of symmetry of said lawnmower, an inboard end of said rigid flat plate being positioned inside a hollow interior of said blade housing and an outboard end of said rigid flat plate being positioned externally to said blade housing;

said position of repose of said rigid flat plate allowing grass clippings that are propelled by a rotating blade of said lawnmower to travel without obstruction toward said discharge port;

an elongate cord secured to an outboard edge of said rigid flat plate, said outboard edge being positioned externally to said blade housing;

a torsion spring secured to said rigid flat plate that applies no bias to said rigid flat plate when said rigid flat plate is in said position of repose;

said elongate cord adapted to be manually pulled in a leading-to-trailing direction during lawnmower operation by an operator disposed in trailing relation to said discharge port;

said pulling of said cord causing pivoting about said hinge of said rigid flat plate relative to said position of repose, said pivoting creating a bias supplied by said torsion spring, and said pivoting causing said inboard end of said rigid flat plate to drive matted grass out of said discharge port;

said rigid flat plate having a fully rotated position when said cord is fully retracted and said rigid flat plate is parallel to said longitudinal axis of symmetry; and said bias returning the rigid flat plate to its position of repose when said cord is released by said lawnmower operator.

2. The apparatus of claim 1, further comprising:

a spike mounted to said rigid flat plate in normal relation to a plane of said rigid flat plate;

said spike mounted to said inboard end of said rigid mounting plate;

said spike being parallel to the longitudinal axis of symmetry of said lawnmower when said rigid flat plate is in its position or repose;

said spike being normal to said longitudinal axis of symmetry of said lawnmower when said rigid flat plate is in said fully rotated position; and said spike positioned externally of said blade housing when said rigid flat plate is in said fully rotated position.

* * * * *